(12) United States Patent
Reisacher et al.

(10) Patent No.: US 11,376,690 B2
(45) Date of Patent: Jul. 5, 2022

(54) LASER MACHINE TOOL HAVING SUCTION SYSTEM

(71) Applicant: SAUER GmbH, Stipshausen (DE)

(72) Inventors: Martin Reisacher, Kempten (DE); Andreas Abt, Oy-Mittelberg (DE)

(73) Assignee: SAUER GmbH, Stipshausen (DE)

( * ) Notice: Subject to any disclaimer, the term of this patent is extended or adjusted under 35 U.S.C. 154(b) by 0 days.

(21) Appl. No.: 16/645,729

(22) PCT Filed: Sep. 7, 2018

(86) PCT No.: PCT/EP2018/074136
§ 371 (c)(1),
(2) Date: Mar. 9, 2020

(87) PCT Pub. No.: WO2019/048613
PCT Pub. Date: Mar. 14, 2019

(65) Prior Publication Data
US 2020/0298338 A1 Sep. 24, 2020

(30) Foreign Application Priority Data
Sep. 8, 2017 (DE) ...................... 10 2017 215 911.1

(51) Int. Cl.
*B23K 26/16* (2006.01)
*B23K 26/342* (2014.01)
*B23K 26/12* (2014.01)

(52) U.S. Cl.
CPC ............ *B23K 26/16* (2013.01); *B23K 26/127* (2013.01); *B23K 26/342* (2015.10)

(58) Field of Classification Search
CPC .......... B22F 10/20; B22F 10/70; B22F 10/10; B22F 10/30; B22F 10/28; B22F 10/322;
(Continued)

(56) References Cited

U.S. PATENT DOCUMENTS 5,556,324 A * 9/1996 Shank, Jr. ............... B24C 9/00
451/87
8,753,105 B2 * 6/2014 Scott ..................... B22F 10/322
264/510
(Continued)

FOREIGN PATENT DOCUMENTS

CH 708 183 A2 12/2014
CN 106346003 A 1/2017
(Continued)

OTHER PUBLICATIONS

Nowotny et al., "Laser-Einheit macht Auftragschweißen auf Bearbeitungszentrum möglich," MM Das IndustrieMagazin, 2009, pp. 42-44.
(Continued)

*Primary Examiner* — Ibrahime A Abraham
*Assistant Examiner* — Chris Q Liu
(74) *Attorney, Agent, or Firm* — Oliff PLC (57) ABSTRACT

A machine for machining workpieces and/or for producing molded bodies by location-selective solidification of material powder to form connected regions by means of a focused laser beam, including: a process chamber which can be closed by a process chamber door and which encloses a process space, a material powder container cabinet, which can be closed by a door, for storing material powder, and a suction system. The suction system has a fan for generating an air flow, a first suction apparatus fluidically connected to the fan by a first waste air duct to suction particles out of the process space, and a second suction apparatus fluidically connected to the fan by a second waste air duct to suction particles out of the material powder container cabinet. The first suction apparatus has means for controlling its suction power and/or the second suction apparatus has means for controlling its suction power.

8 Claims, 6 Drawing Sheets

(58) Field of Classification Search
CPC .......... B22F 10/34; B22F 10/40; B22F 10/73;
B23K 26/123; B23K 26/32; B23K
26/342; B23K 26/142; B23K 26/16;
B23K 26/34; B23K 26/12; B23K 26/127;
B23K 26/144; B23K 26/03; B23K
26/0604; B23K 26/082; B23K 26/083;
B23K 26/0853; B23K 26/1224; B23K
26/128; B23K 26/1437; B23K 26/1476;
B23K 26/22; B23K 26/346; B23K
26/354; B23K 26/70; B23K 26/702;
B33Y 30/00
USPC .............. 219/121.6, 121.61, 121.65, 121.84,
219/121.85, 121.86, 76.12
See application file for complete search history.

(56) References Cited

U.S. PATENT DOCUMENTS

| | | | |
|---|---|---|---|
| 2002/0020461 A1 | 2/2002 | Platsch | |
| 2002/0090410 A1 | 7/2002 | Tochimoto et al. | |
| 2009/0255912 A1* | 10/2009 | Dietrich | B29C 64/371 425/174 |
| 2011/0135840 A1* | 6/2011 | Doye | B23K 26/34 118/723 R |
| 2012/0251378 A1* | 10/2012 | Abe | B22F 10/20 425/78 |
| 2014/0301883 A1* | 10/2014 | Wiesner | B23K 26/144 425/162 |
| 2015/0367573 A1* | 12/2015 | Okazaki | B29C 64/153 425/174.4 |
| 2017/0014905 A1* | 1/2017 | Kawada | B29C 64/214 |
| 2017/0122580 A1* | 5/2017 | Karamanos | F24F 7/04 |
| 2017/0173610 A1* | 6/2017 | Altin | B05B 14/48 |
| 2017/0341299 A1* | 11/2017 | Kniola | B22F 10/70 |
| 2018/0009007 A1* | 1/2018 | Craft | B08B 3/006 |
| 2018/0126650 A1* | 5/2018 | Murphree | B22F 10/20 |
| 2018/0178285 A1* | 6/2018 | Martin | B29C 64/393 |

FOREIGN PATENT DOCUMENTS

| | | |
|---|---|---|
| DE | 10 2011075748 A1 | 11/2012 |
| DE | 10 2013 224 649 A1 | 6/2015 |
| DE | 10 2016 112652 A1 | 1/2017 |
| DE | 10 2015 222 689 A1 | 5/2017 |
| EP | 2 052 845 A2 | 4/2009 |

OTHER PUBLICATIONS

Oct. 2018 International Search Report issued in International Patent Application No. PCT/EP2018/074136.
Oct. 18, 2018 Written Opinion of the International Searching Authority issued in International Patent Application No. PCT/EP2018/074136.
Nov. 19, 2021 Office Action issued in Chinese Patent Application No. 201880065635.6.
Jan. 25, 2022 Office Action issued in European Patent Application No. 18766235.8.

* cited by examiner

LASER MACHINE TOOL HAVING SUCTION SYSTEM

The present invention relates to a machine for machining workpieces and/or for producing molded bodies by location-selective solidification of material powder to form connected regions by means of a focused laser beam, the machine having a suction system for suctioning out particles.

The present invention further relates to a method for suctioning particles out of a process space in a process chamber which can be closed by a process chamber door of a machine for processing workpieces and/or for producing molded bodies by location-selective solidification of material powder to form connected regions by means of a focused laser beam.

BACKGROUND

A generic machine is, in particular, a machine for producing molded bodies according to the principle of selective laser melting, selective laser sintering or laser deposition welding. In particular, material powders made of metal, plastic or ceramic can be used. In the following, the term laser machine tool or simply machine will be used to summarize the different types of machines for machining/producing/manufacturing a workpiece or a molded body with a laser beam.

With the method of selective laser melting, laser sintering or laser deposition welding, molded bodies, such as machine parts, tools, prostheses, pieces of jewelry, etc., can be produced or processed in accordance with the geometry description data of the corresponding molded bodies, for example, by layered construction from a metallic or ceramic material powder or from a plastic powder. In the manufacturing process, the material powder is guided by a powder nozzle to the focal point of a focused laser beam, heated by the focused laser beam so that the material powder is remelted in the irradiated areas to form connected solidified regions. After cooling, a layer of material is formed which can be mechanically processed.

For the state of the art in the field of selective laser melting, reference is made to DE 10 2015 522 689 A1, for example. Furthermore, a laser machine tool of the type mentioned above is known from EP 2 052 845 A2, for example. A machine tool for cladding is described, for example, in the patent application DE 10 2013 224 649 A1.

The article "Laser-Einheit macht Auftragsschweißen auf Bearbeitungszentrum möglich" (Laser unit makes cladding on machining centers possible) by Nowotny et al. in the magazine "MM Das Industriemagazin", 17/2009, page 42 et seq. describes a laser processing optics which is inserted into the milling spindle of a CNC machine via a steep taper. Weld metal (material powder) is fed into the laser focal point through a powder nozzle. The workpiece can be milled in the same machine.

There are essentially two types of machines known for the machining of workpieces and/or for the production of molded bodies by location-selective solidification of material powder to form connected regions by means of a laser beam, in particular by selective laser melting or selective laser sintering or laser deposition welding. The machine types differ, inter alia, in the way the material powder is provided. In a first type of machine, a powder bed is built up in layers. On a second type of machine, the material powder is provided by means of a powder nozzle at the location of processing. The present invention relates in particular to machines in which the material powder is provided by means of a powder nozzle at the focal point of the laser. The mechanical setup for moving the laser processing head and/or the workpiece can be done, for example, as in a known five-axis machining center, wherein the laser processing head is provided instead of a mechanical tool. For some years now, machine tools have also been available on the market that allow both laser machining and metal cutting, for example with a milling tool. In such hybrid machining centers, the laser processing head can be attached to the tool spindle holder.

Welding fumes can be produced during the above mentioned processes, especially during laser deposition welding, which can be harmful to human health, as they can contain respirable particles that can be carcinogenic so that a considerable health risk can arise from such particles. Welding fume particles, for example, can be a few micrometers or even a few tenths of a micrometer in size. They are therefore also called fine dust particles. Due to the possible health hazard for people, an operator of such a machine must be protected against inhalation of the particles. As a first protective measure, an operator of the machine can wear a respirator mask. However, the protection provided by a mask may be insufficient. In addition, other people who are in the vicinity of the machine are not protected. In order to avoid contamination of the ambient air of the machine with health hazardous particles as far as possible, laser machine tools therefore usually have suction apparatuses for suctioning the particles from the process space.

A laser machine tool usually has a process chamber which can be closed by a process chamber door and which encloses a process space. A vacuum can be built up in the process chamber by means of a suction apparatus so that no particles are released into the environment, at least when the process chamber is closed. When operating the suction apparatus, the air flow must be adjusted in such a way that, on the one hand, the most efficient suction of the particles is ensured. On the other hand, the air flow generated in the process space must not disturb the process itself. For example, too strong an air flow can disturb a material powder flow generated by a carrier gas flowing through the powder nozzle so that a sufficient amount of material powder or an uneven distribution of material powder does not arrive at the focal point of the laser beam. In order to avoid a disturbance of the material powder flow, suction apparatuses usually have a manually adjustable throttle valve to adjust the suction power. Throttle adjustment is usually performed once during installation or maintenance of the machine.

However, due to the defined reduction of the suction power, the full suction power can no longer be used to suction the particles out from the process space after the process has ended. Thus, before opening the process chamber door, it is necessary to wait unnecessarily long until all the air in the process chamber has been completely exchanged at least once so that contamination of the environment or the operator of the machine with particles can be ruled out as far as possible.

SUMMARY

In the light of the aforesaid, the object underlying the present invention is to provide a machine with a suction system in which the suction power is adjustable.

The problem is solved by a machine according to the generic term of claim 1. According to the invention, the first suction apparatus has means for controlling a suction power of the first suction apparatus and/or the second suction apparatus has means for controlling a suction power of the second suction apparatus.

The problem is further solved by a method for suctioning particles from a process space in a process chamber which can be closed by a process chamber door of a machine for processing workpieces and/or for producing molded bodies by location-selective solidification of material powder to form connected regions by means of a focused laser beam. In a first method step, the process chamber door is locked before the machine starts a machining process. This ensures that the process chamber door cannot be opened during the machining process. In a further method step, a first suction apparatus is operated to suction particles out from the process space at reduced power while the machine is carrying out the machining process. The throttling of the power is effected, for example, depending on the material powder used or depending on a material powder stream. This prevents an air flow generated by the suction from influencing the material powder flow. In a further method step, the first suction apparatus for suctioning particles out from the process space is operated at maximum power for a defined period of time after a machining process is interrupted or terminated. This advantageously allows that all harmful particles or at least a large proportion of harmful particles can be suctioned from the process chamber before the process chamber door can be opened. The time period is determined in such a way that all air in the process space is completely exchanged at least once within the period. In a final method step, the process chamber door is unlocked after the specified time period has elapsed. As soon as all particles are sucked out of the process space, the process chamber door can be opened again. There is no longer any risk of an operator of the machine or the ambient air of the machine being contaminated with harmful particles.

The term throttled power refers to a suction power that is lower than a maximum suction power. The air flow for suction is generated by a fan, which is preferably operated at constant power. The suction power of a suction apparatus is then preferably throttled by limiting the air flow, for example, by means of throttle valves. The throttle valves can, for example, be arranged in waste air ducts of the suction apparatus, which are fluidically connected to the blower.

Preferred configurations and further developments, which can be used individually or in combination with each other, are the subject matter of the dependent claims.

Preferably, the means for controlling the suction power of the first suction apparatus and/or the second suction apparatus each have actuators. The actuators can preferably be controlled separately by a machine control. Thus, the suction power of the first suction apparatus and/or the suction power of the second suction apparatus can be adjusted fully automatically and integrated into a process sequence. In addition, the suction power can be adjusted depending on a condition of the machine.

In a preferred configuration of the machine, an air inlet and an air outlet connected to the first waste air duct are arranged in the process space. The air inlet and the air outlet are preferably arranged in such a way that an air flow is generated over a focal point of the focused laser beam. If the generated air flow passes over the focal point of the laser beam, generated welding fumes can be suctioned very efficiently, because the welding fumes are generated at or near the focal point of the laser beam. Furthermore, the first suction apparatus can be operated with a lower suction power if the air flow passes where the welding fumes are generated.

In particular, the air inlet and the air outlet are arranged so that the air flow is generated in a horizontal direction. Such an arrangement is particularly advantageous if the laser processing head emits the focused laser beam vertically onto the workpiece. The air flow generated in horizontal direction can then flow past the workpiece unhindered.

It is preferred that the means for controlling the suction power of the first suction apparatus and/or the second suction apparatus are arranged to adjust the suction power of the first suction apparatus and/or the second suction apparatus depending on an opening state of the process chamber door and/or an opening state of the door of the material powder container. When the process chamber door is open or when the door of the material powder container is open, a higher suction power is required to prevent contamination of the environment by particles. In other words, to maintain a vacuum in the process space or in the material powder container, a higher suction power is required than when the doors are closed in each case. In particular, the process chamber door can only be opened when the machining process of the machine is finished or interrupted. This means that the first suction apparatus can be operated at full power with the process chamber door open, without any risk of negatively influencing the powder flow. The machine control can be set up to lock the process chamber door while a machining process is in progress. After finishing or interrupting the process, the process chamber door can remain locked for a defined period of time for safety reasons, during which the suction of the generated welding fumes is carried out. If the suction power is increased, this defined period can be shortened.

The means for controlling the suction power of the first suction apparatus and/or the second suction apparatus may be arranged to adjust the suction power of the first suction apparatus and/or the second suction apparatus in dependence on a machining and/or manufacturing process of the machine. In particular, the suction power of the first suction apparatus is throttled during a machining and/or manufacturing process in order to avoid an influence on the material powder flow from the powder nozzle. If the machining and/or manufacturing process is interrupted or finished, the suction power of the first suction apparatus can be set to the maximum value.

The means for controlling the suction power of the first suction apparatus and/or the second suction apparatus may be arranged to adjust the suction power of the first suction apparatus and/or the second suction apparatus depending on the material and/or the material composition of the material powder. When using different materials, different welding fumes can be produced depending on the material composition, which can be formed differently in composition, pollutant particle, pollutant or smoke concentration and toxicity of the pollutants contained. This exemplary configuration therefore has the advantage that the suction power can be adjusted depending on the welding fumes produced, wherein a higher suction power can preferably be adjusted for materials with relatively higher pollutant concentration in the welding fumes and/or higher toxicity of the pollutants contained and a lower suction power can be adjusted for materials with relatively lower pollutant concentration in the welding fumes and/or lower toxicity of the pollutants contained.

The suction method may further include a step of operating a second suction apparatus for suctioning particles out from the housing (e.g. a material powder cabinet or material powder container cabinet) for the material powder containers. The suction power of the second suction apparatus can be adjusted depending on whether a door of the housing or the material powder cabinet is open or closed. When the door of the material powder cabinet (or material powder container cabinet), in which one or more material powder containers may be arranged, is open, the second suction apparatus can be operated at full suction power so that any escape of material powder from the material powder container into the environment is prevented or at least reduced. When the door of the material powder cabinet is closed, the second suction apparatus can be operated with reduced suction power, since the full power is not required to generate a sufficiently high vacuum in the material powder cabinet.

BRIEF DESCRIPTION OF THE FIGURES

Further preferred configurations are described in more detail below on the basis of an embodiment shown in the drawings, to which the invention is, however, not restricted.

It is shown schematically by.

DETAILED DESCRIPTION OF THE INVENTION BY MEANS OF AN EMBODIMENT

In the following description of a preferred embodiment of the present invention, identical reference signs denote identical or comparable components.

Figure 1:
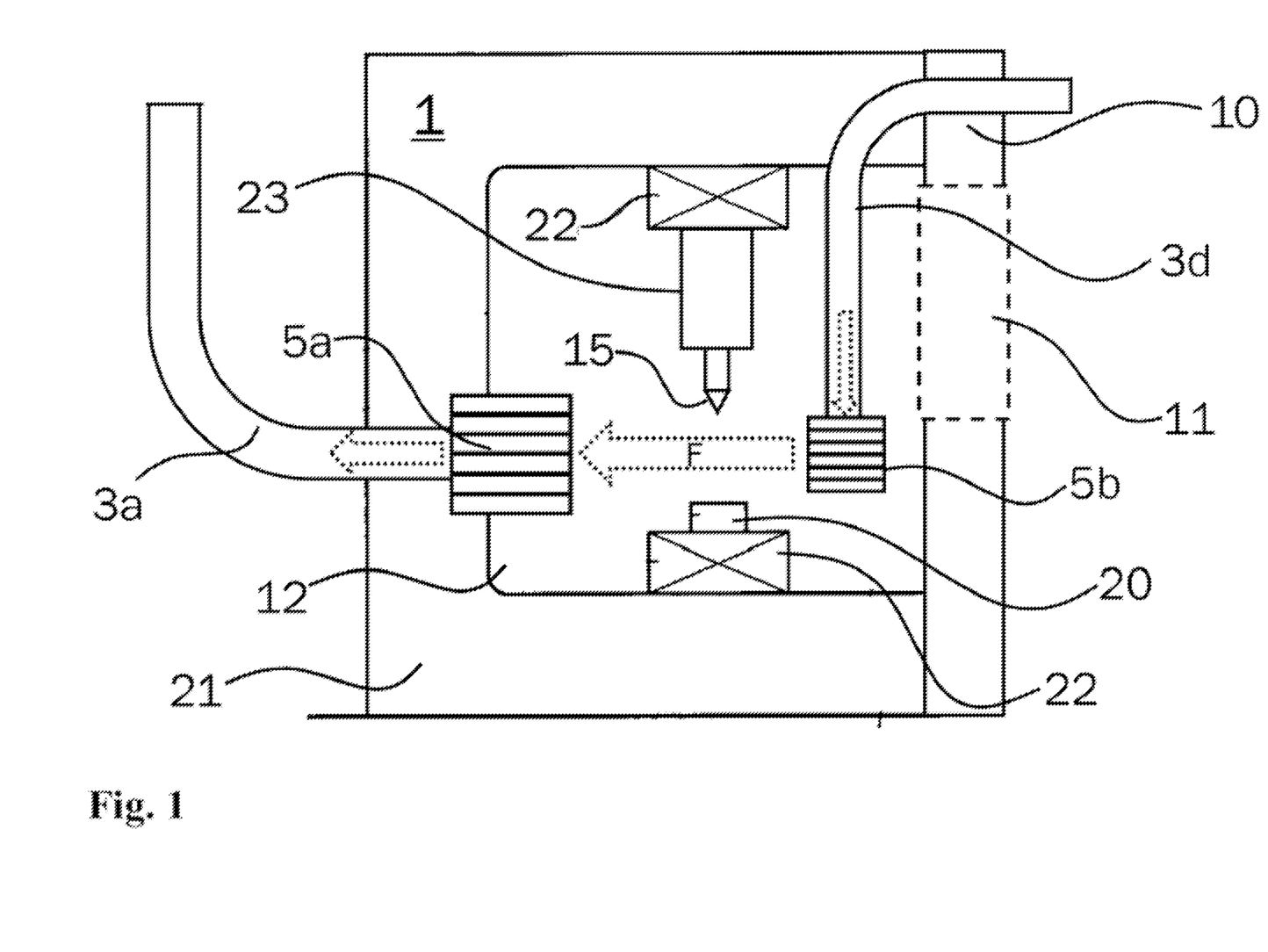
FIG. 1: a structure of a machine tool for producing or machining a molded body or workpiece by means of focused laser radiation.

FIG. 1 shows a schematic view of a machine 1 for machining a workpiece and/or for producing a molded body by location-selective solidification of material powder to form connected regions by means of laser radiation. The machine 1 comprises a machine frame 21, to which a workpiece table 20 on the one hand and a laser processing head 23 with a powder nozzle 15 on the other hand are mounted indirectly via intermediate adjusting axes 22. The adjusting axes 22 can each have several translatory (X, Y, Z) or rotary (φ, λ, θ) axes, which can be adjusted according to a machine control. The configuration can be such that, for example, the laser processing head 23 is fixed to the machine frame 21 via one, two or three translatory adjusting axes 22 (X and/or Y and/or Z), while the workpiece table 20 is attached to the machine frame 21 via one, two or three rotary adjusting axes 22.

For example, the machine 1 can be a five-axis laser machine tool for the production of molded bodies by location-selective solidification of material powder to form connected regions by means of laser radiation. A workpiece can be releasably attached to the workpiece table 20 for machining. Alternatively, a molded body can be built up layer by layer on the workpiece table 20 by location-selective hardening of material powder.

Such a laser machine tool 1 usually has a closed process chamber 10, in which a vacuum can be generated by means of a suction system to protect an environment of the machine 1 from contamination by welding fumes or other particles, for example, material powder. The process chamber 10 encloses a process space 12, which is accessible via a process chamber door 11. The process chamber door 11 can comprise a locking mechanism that can be actuated depending on the machining process. This can prevent the process chamber door 11 from being opened during a running machining process.

The suction system can suck air from the process space 12 via an air outlet 5a. The air outlet 5a is fluidically connected to a fan 2 via a first waste air duct 3a. Via an air inlet 5b, which is fluidically connected to a supply air duct 3d, fresh air can be supplied to the process space 12. By means of a suitable positioning of the air inlet 5b and the air outlet 5a in the process space 12, the direction of the air flow F in the process chamber 12 can be adjusted in such a way that the air flow F passes essentially horizontally an operating point of the laser machine tool 1, where a focused laser beam L fuses the material powder P fed through the powder nozzle 15 with the workpiece. The operating principle of laser deposition welding is described in more detail below with reference to FIG. 6. The air flow F is shown as a dotted arrow in FIG. 1. Further dotted arrows illustrate a supply air flow through the supply air duct 3d and an exhaust air flow through the first waste air duct 3a.

In an alternative configurations of the invention, the air inlet 5b may also be omitted. Fresh air from the environment can then be supplied through slots and/or joints in the process chamber 10 or between the process chamber 10 and the process chamber door 11. However, the provision of the air inlet 5b has the advantage that the direction of the air flow F can be defined more precisely so that an essentially laminar, horizontal flow can be generated via the operating point of the machine 1. In alternative configurations, more than one air inlet 5b and/or more than one air outlet 5a may be provided. In addition, the air flow F can also be generated with any other flow direction, for example vertical, instead of horizontal.

Figure 4:
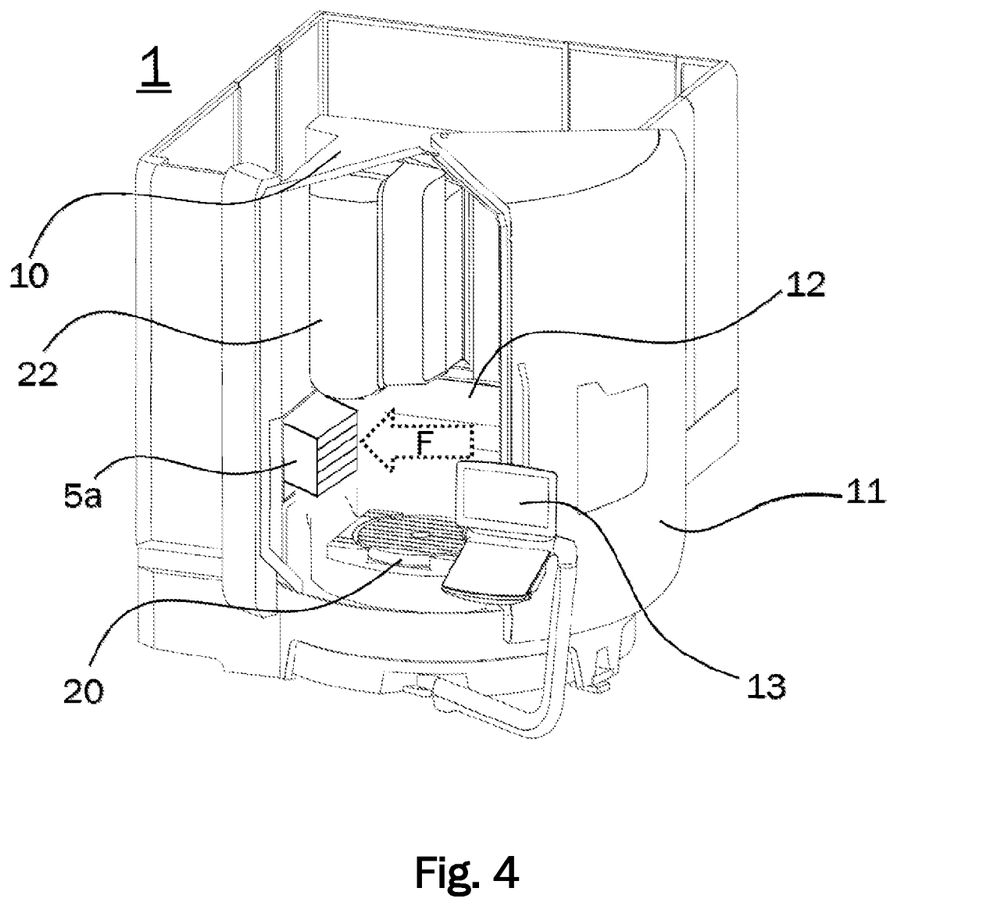
FIG. 4: a perspective view of the process space of a laser machine tool according to an embodiment.

A perspective view of a five-axis laser machine tool 1 according to the invention for producing molded bodies by location-selective solidification of material powder to form connected regions by means of laser radiation according to an embodiment is shown in FIG. 4. The embodiment shown essentially corresponds to the machine 1 schematically shown in FIG. 1. However, FIG. 4 does not show a laser processing head 23 fixed to the adjusting axis 22.

The workpiece table 20 is arranged in a process chamber 10 (process cabin) which can be closed by a process chamber door 11 and which encloses the process space 12 and. A control unit 13 located outside the process chamber 10 serves as interface between operator and machine control. For example, measured values and/or warning messages and/or control applications can be shown on a display of the control unit 13. In the process space 12, the air outlet 5a is arranged on the left. The dotted arrow illustrates the air flow F generated by the suction system. The air inlet 5b is not visible in FIG. 4 because it is covered by the process chamber door 11.

Figure 2:
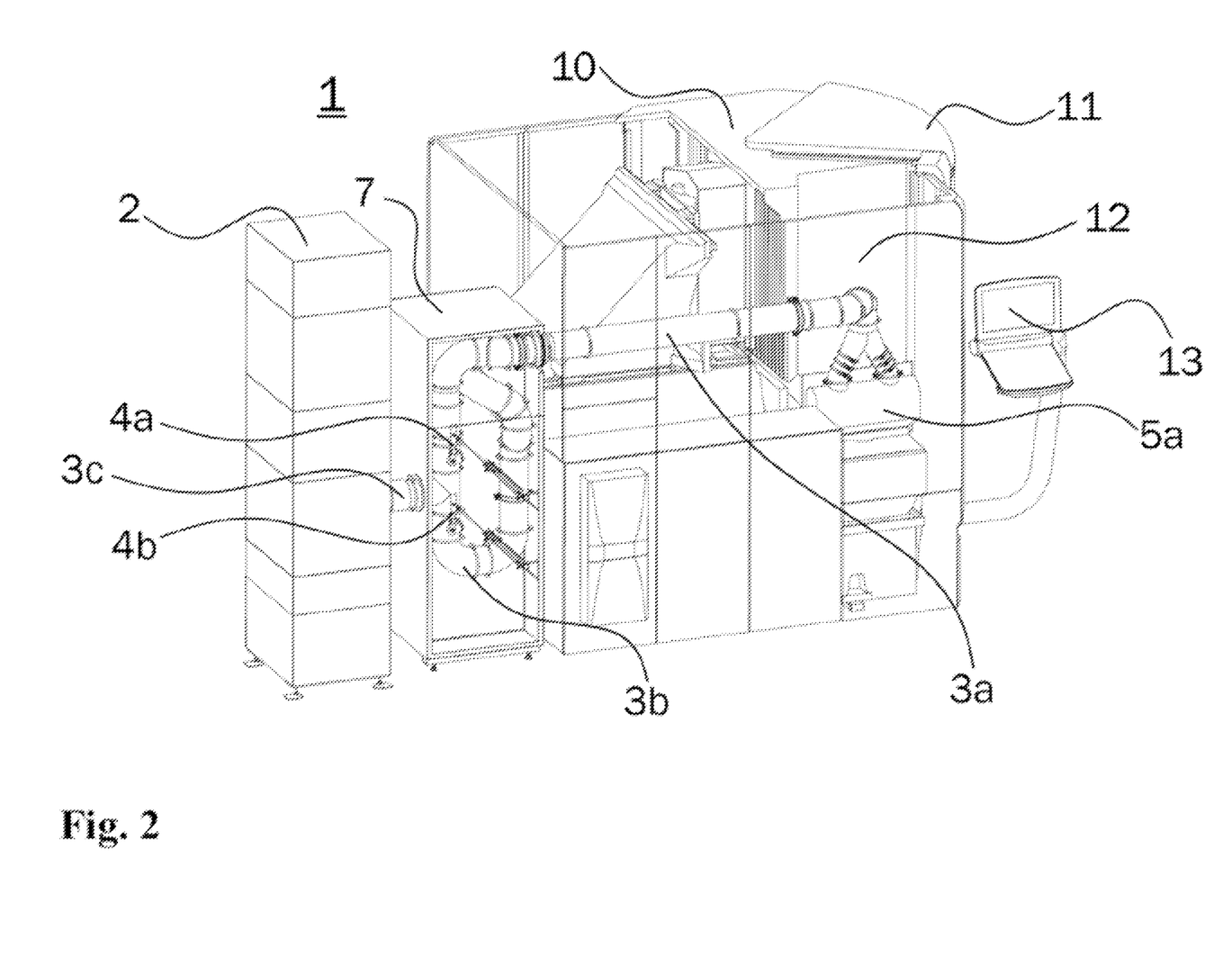
FIG. 2: a perspective view of an example of a laser machine tool having a suction system.
Figure 7:
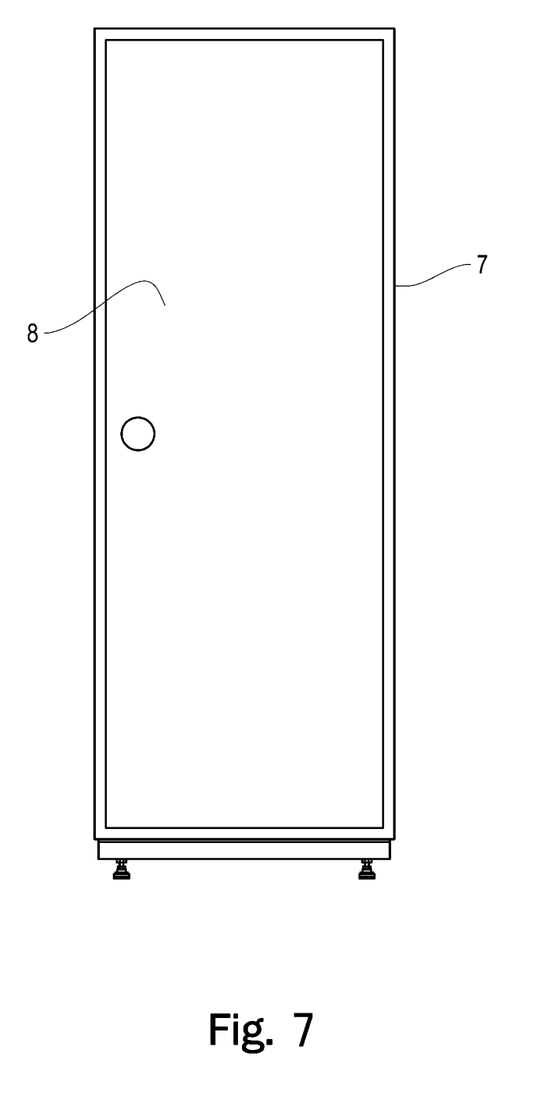
FIG. 7: an illustration of an example of a material powder container cabinet including a door.

FIG. 2 shows a perspective rear view of the inventive five-axis laser machine tool 1. FIG. 2 illustrates further details of the suction system not shown in FIG. 4. Machine 1 includes a material powder container cabinet 7 for storing material powder in one or more material powder containers in the material powder container cabinet 7. The material powder container cabinet 7 has a door 8 (shown in FIG. 7) through which an operator can fill the not shown material powder container with material powder. From the material powder container cabinet 7, lines lead the material powder to the powder nozzle 15. A carrier gas, for example argon, is used to transport the material powder.

The suction system comprises a fan 2 for generating an air flow, a first suction apparatus for suctioning particles out of the process space 12 and a second suction apparatus for suctioning particles out of the material powder container cabinet 7. The first suction apparatus comprises a first waste air duct 3a, via which the air outlet 5a located in the process space 12 is connected to the fan 2. The second suction apparatus comprises a second waste air duct 3b, via which an air outlet (not shown) arranged in the material powder container cabinet 7 is fluidically connected with the fan 2. The first waste air duct 3a and the second waste air duct 3b are connected via a T-piece to a third waste air duct 3c, which is fluidically connected to the fan 2.

Figure 3:
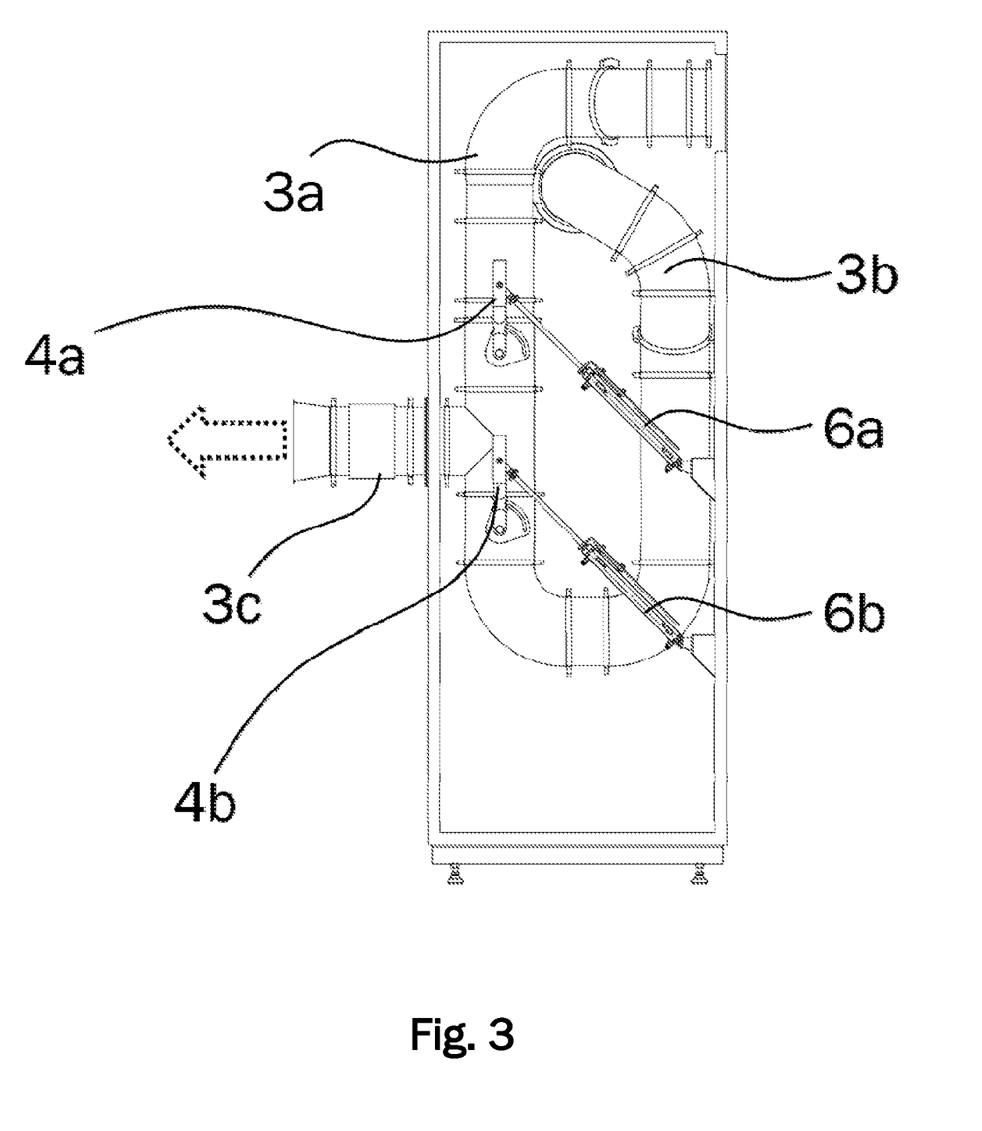
FIG. 3: a detailed view of the waste air ducts and throttle valves of the laser machine tool according to the embodiment of FIG. 2.

The first suction apparatus and the second suction apparatus each have means 4a, 4b for adjusting a suction power. A detailed view in FIG. 3 shows the T-piece that connects the first waste air duct 3a and the second waste air duct 3b with the third waste air duct 3c. FIG. 3 shows the means for adjusting the suction power as throttle valves 4a and 4b in the first waste air duct 3a and in the second waste air duct 3b, respectively. The throttle valves 4a, 4b can be controlled via actuators 6a, 6b. In particular, the actuators 6a, 6b are controlled by the machine control. By adjusting a degree of opening of the throttle valves, an air flow through the first and/or second suction apparatus can be adjusted. In particular, the air flow through the first and/or second suction apparatus can be adjusted as a function of a process and/or as a function of the state of the process chamber door 11 and/or the door of the material powder container 7. Due to the fact that the throttle valves 4a, 4b are controlled by actuators 6a, 6b, the adjustment of the suction power can be integrated into a process sequence fully automatically controlled by the machine control.

The fan 2 can have one or more filters to filter the extracted particles from the airflow. For example, the fan may have a category C filter with dedusting. The particles filtered from the air can be collected in a separate container and removed for disposal. The filtered air flow can either be passed on via an external waste air duct or directed to the environment of the machine 1. In particular, if the filtered air flow is directed to the environment of the machine 1, it must be ensured that the air is as far as possible free of particles harmful to health. For this purpose, the fan may have one or more filters for suspended particles, in particular HEPA filters, for example of category H13 and/or H14.

Other than shown in FIG. 2, a fan 2 located at a distance can also be used to generate the waste air flow. For example, the fan 2 can be located outside a building in which the machine 1 is installed. Thus, the waste air can be discharged directly to the outside so that lower demands can be made on the filtering of the waste air than if the waste air is discharged into the room air.

Figure 5:
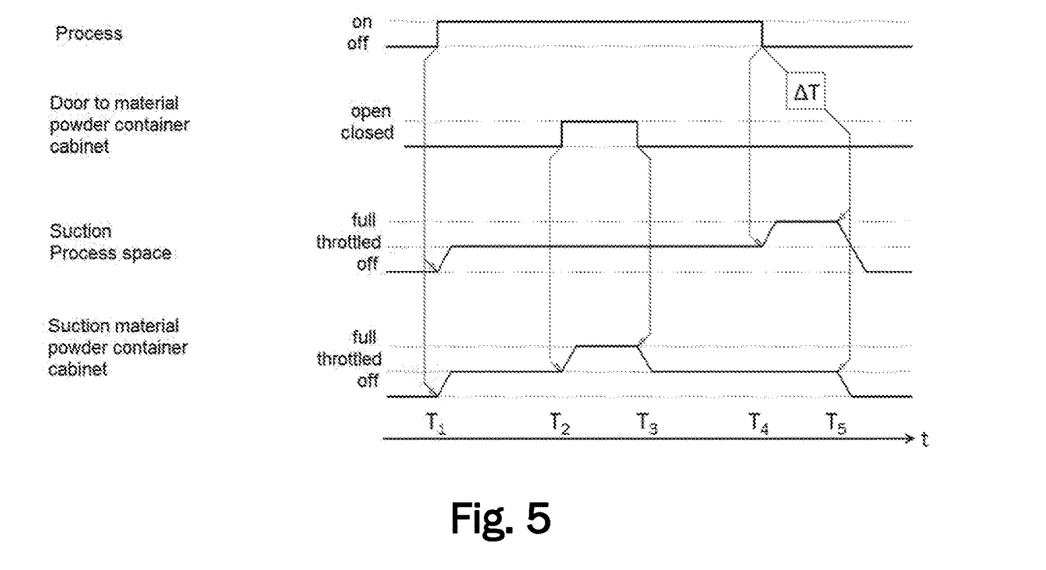
FIG. 5: an exemplary time sequence of the suction.

An exemplary time sequence for suction is now described by means of FIG. 5. The top line in FIG. 5 indicates whether the process is in the "on" or "off" state, that is whether a laser deposition welding process is currently running or not. The second line shows the status of the door to the material powder container cabinet 7, that is whether the door is currently open or closed. The third line indicates whether the suction of process space 12 is in operation at full power, at throttled power or not at all. The bottom line indicates whether the suction of the material powder container cabinet 7 is in operation at full power, at reduced power or not at all. The state of the process chamber door 11 is not shown in FIG. 5. At the lower edge of FIG. 5 a time axis is shown at which five points in time T1 to T5 are depicted, which are explained in the following.

At time T1, the laser deposition welding process starts in the machine 1. The door to the material powder container cabinet 7 and the process chamber door 11 are closed. With the start of the process at time T1, the suction of process space 12 and the suction of the material container cabinet 7 is started, respectively. Both the suction of the process space 12 and the suction of the material powder container 7 are operated at throttled power. The power of the suction of the process space 12 is throttled so that the process is not disturbed by unintentional suction of the material powder from the powder nozzle 15. The power of the suction system of the material powder container cabinet 7 can be operated at a throttled power when the door is closed, since this only requires a vacuum to be maintained which is sufficient to prevent material powder from escaping into the environment of the machine 1.

At time T2, the door to the material powder container cabinet 7 is opened by an operator of the machine 1 to refill material powder. In order to prevent material powder from escaping into the environment as far as possible even when the door is open, the power of the suction out of the material powder container 7 is now increased to maximum power. After the operator has refilled the material powder container 7, he closes the door again at time T3. The suction out of the material powder container cabinet 7 can now be continued at throttled power.

At time T4, the laser deposition welding process is completed in the machine 1. At this time T4, the power of the suction out of the process space 12 is increased to the maximum value in order to clean the process space 12 as completely as possible from welding fumes and other particles. This prevents harmful particles from escaping into the environment when the process chamber door 11 is opened. The suction at maximum power is carried out during a defined period ΔT until time T4, when the suction out of the process space 12 and the material powder container cabinet 7 is switched off. The defined time period ΔT is selected so that at the end of the defined time period ΔT as many harmful particles as possible are suctioned out of the process space 12. The process chamber door 11 can be locked until time T5 so that an operator of the machine 1 can only open the process chamber door 11 when it has been ensured that a large part or, if possible, all harmful particles have been suctioned out of the process space 12.

The method described above can, for example, be controlled by a machine control of the machine 1 which can preferably be operated via the control unit 13. As an alternative to the sequence shown, the suction can also be continued after time T5. However, in order to reduce noise and save energy, it is advantageous to throttle down or completely switch off the suctioning completely after the defined period ΔT.

Figure 6:
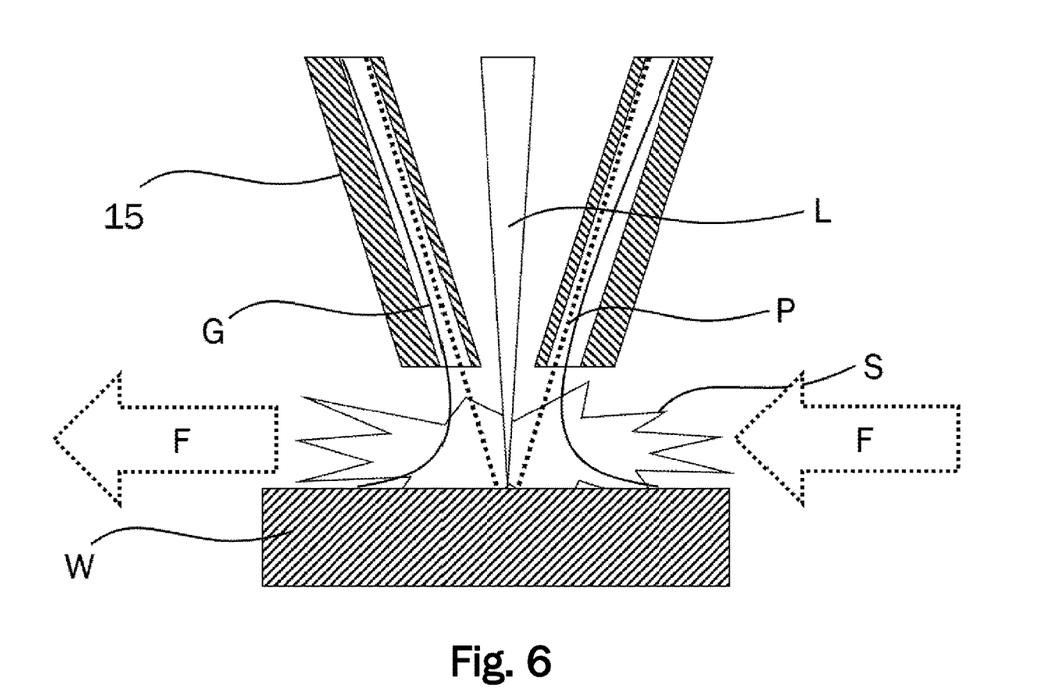
FIG. 6: an illustration of the operation principle of laser deposition welding.

The operating principle of laser deposition welding is illustrated by means of FIG. 6. FIG. 6 shows a powder nozzle 15 near a workpiece W to be machined. A focused laser beam L coming from the laser processing head runs coaxially to the powder nozzle 15 and is focused to an operating point on or just above the workpiece W. The material powder P is guided coaxially to the laser beam L through the powder nozzle 15 to the focal point of the laser beam L on the workpiece W. A protective or carrier gas G such as argon also flows through the powder nozzle 15 and transports the material powder P. The protective gas G also serves to prevent undesired reactions of the heated material powder P or the workpiece W with atmospheric oxygen. During the welding process, welding fumes S may be generated. Said welding fumes are to be removed from the operating space 12 of the machine 1 by the suction system described above. For this purpose, the suction system generates the air flow F illustrated by dotted arrows, which preferably passes the workpiece W as a horizontal, laminar flow, thereby carrying the welding fumes S with it. The strength of the air flow F must be adjusted so that the air flow F does not disturb the flow of the material powder P with carrier gas G. If the air flow F is set too strong, material powder P can be suctioned out by the powder nozzle 15, which would disturb the process.

A typical value of the maximum power of the suction out of the process space is approximately 1000 m$^3$ per hour. In throttled operation, approximately 200 to 600 m$^3$ per hour are suctioned out. In comparison, during the laser welding process, a flow of about 3 to 6 liters of carrier gas with material powder, for example argon, per minute typically flows through the powder nozzle 15. When comparing the two values, it should be noted that the waste air flow F has a much larger diameter so that the flow velocity of the powder flow (carrier gas with material powder) is usually at least one order of magnitude greater than the flow velocity of the air flow F.

The features disclosed in the above description, claims and drawings may be relevant to the realization of the invention in its various configurations, either individually or in any combination.

LIST OF REFERENCE SIGNS 1 laser machine tool
2 fan
3a first waste air duct
3b second waste air duct
3c third waste air duct
3d supply air duct
4a first throttle valve
4b second throttle valve
5a air outlet
5b air inlet
6a first actuator
6 second actuator
7 material powder container cabinet
10 process chamber
11 process chamber door
12 Process space
13 control unit
15 powder nozzle
20 workpiece table
21 machine frame
22 adjusting axes
23 laser processing head
L laser beam
W workpiece
P workpiece powder
G protective and/or carrier gas
S welding fumes

The invention claimed is:
1. A machine for machining a workpiece or for producing a molded body, the machine comprising:
a machine frame;
a workpiece table and a laser processing head mounted indirectly to the machine frame via intermediate adjusting axes, the laser processing head including a powder nozzle, and being configured to emit a focused laser beam;
a process chamber enclosing a process space and comprising a process chamber door, which is configured to open and close the process chamber, the workpiece table and the laser processing head being disposed inside the process chamber;
a material powder container cabinet that is configured to store material powder and comprises a door that is configured to open and close the material powder container cabinet; and
a suction system comprising:
a fan configured to generate an air flow;
a first suction apparatus including a first waste air duct that is fluidically connected to the fan, the first suction apparatus being configured to suction particles out of the process space;
a second suction apparatus including a second waste air duct that is fluidically connected to the fan, the second suction apparatus being configured to suction particles out of the material powder container cabinet; and
an air inlet and an air outlet that are fluidically connected to the first waste air duct and are arranged in the process space;
wherein:
one or both of the first suction apparatus and the second suction apparatus comprise a suction power controlling means for controlling a suction power thereof; and
the machine is configured to machine the workpiece or produce the molded body by location-selective solidification of the material powder, to form connected regions by the focused laser beam.

2. The machine according to claim 1, wherein the suction power controlling means comprises actuators.

3. The machine according to claim 1, wherein the air inlet and the air outlet are arranged to generate an air flow over a focal point of the focused laser beam.

4. The machine according to claim 3, wherein the air inlet and the air outlet are arranged so that the air flow is generated in a horizontal direction.

5. The machine according to claim 1, wherein the suction power controlling means is configured to adjust the suction power depending on one or both of an opening state of the process chamber door and an opening state of the door of the material powder container cabinet.

6. The machine according to claim 1, wherein the suction power controlling means is configured to adjust the suction power depending on one or both of a machining process and a manufacturing process of the machine.

7. The machine according to claim 1, wherein the suction power controlling means is configured to adjust the suction power depending on one or both of a material and a material composition of the material powder.

8. The machine according to claim 1, wherein the powder nozzle is configured to deliver the material powder to the process space of the process chamber.

* * * * *